Stanley J. Mabon
INVENTOR.

April 6, 1965 S. J. MABON 3,176,635
AUTOMATIC PLANTER AND PLASTIC LAYING DEVICE
Filed Jan. 9, 1963 4 Sheets-Sheet 3
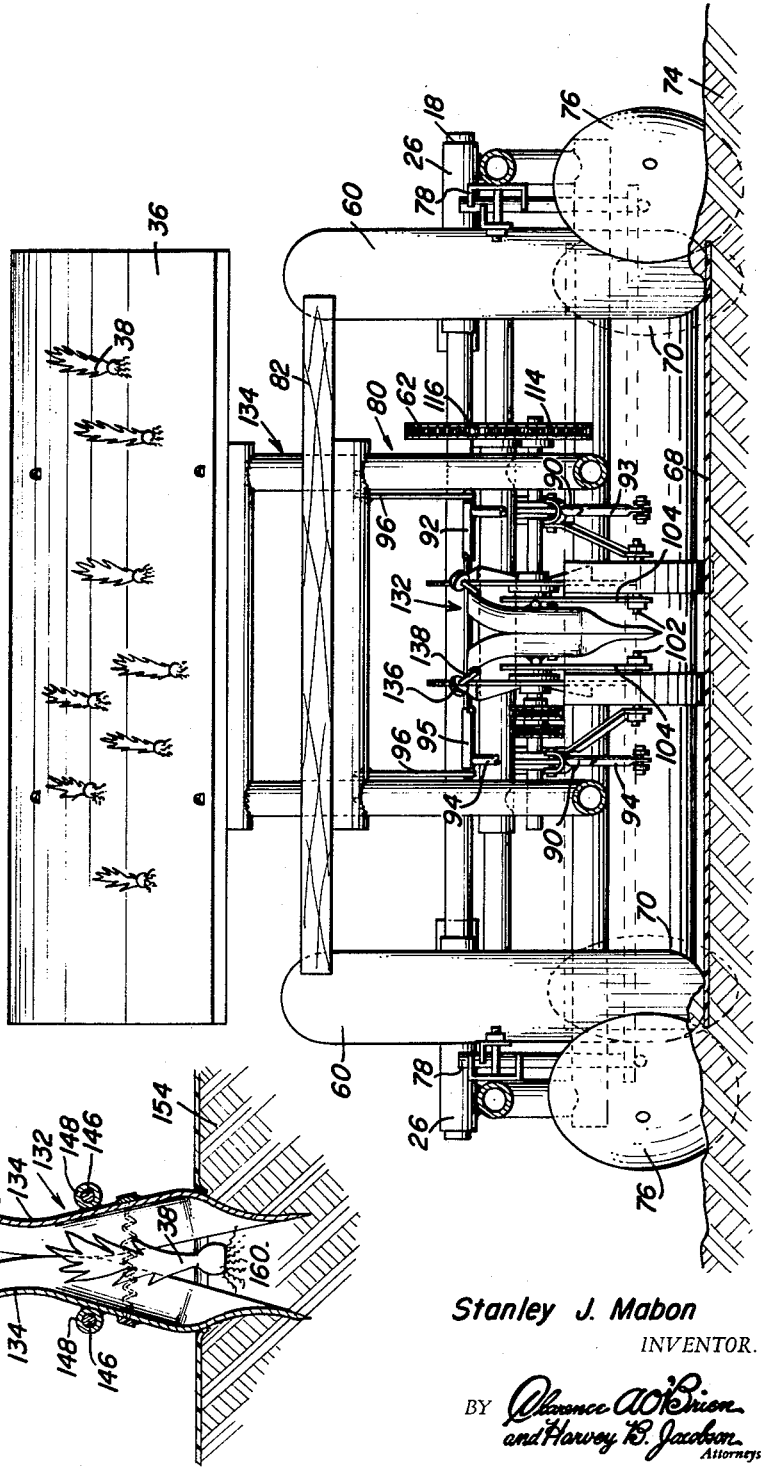
Stanley J. Mabon
INVENTOR.

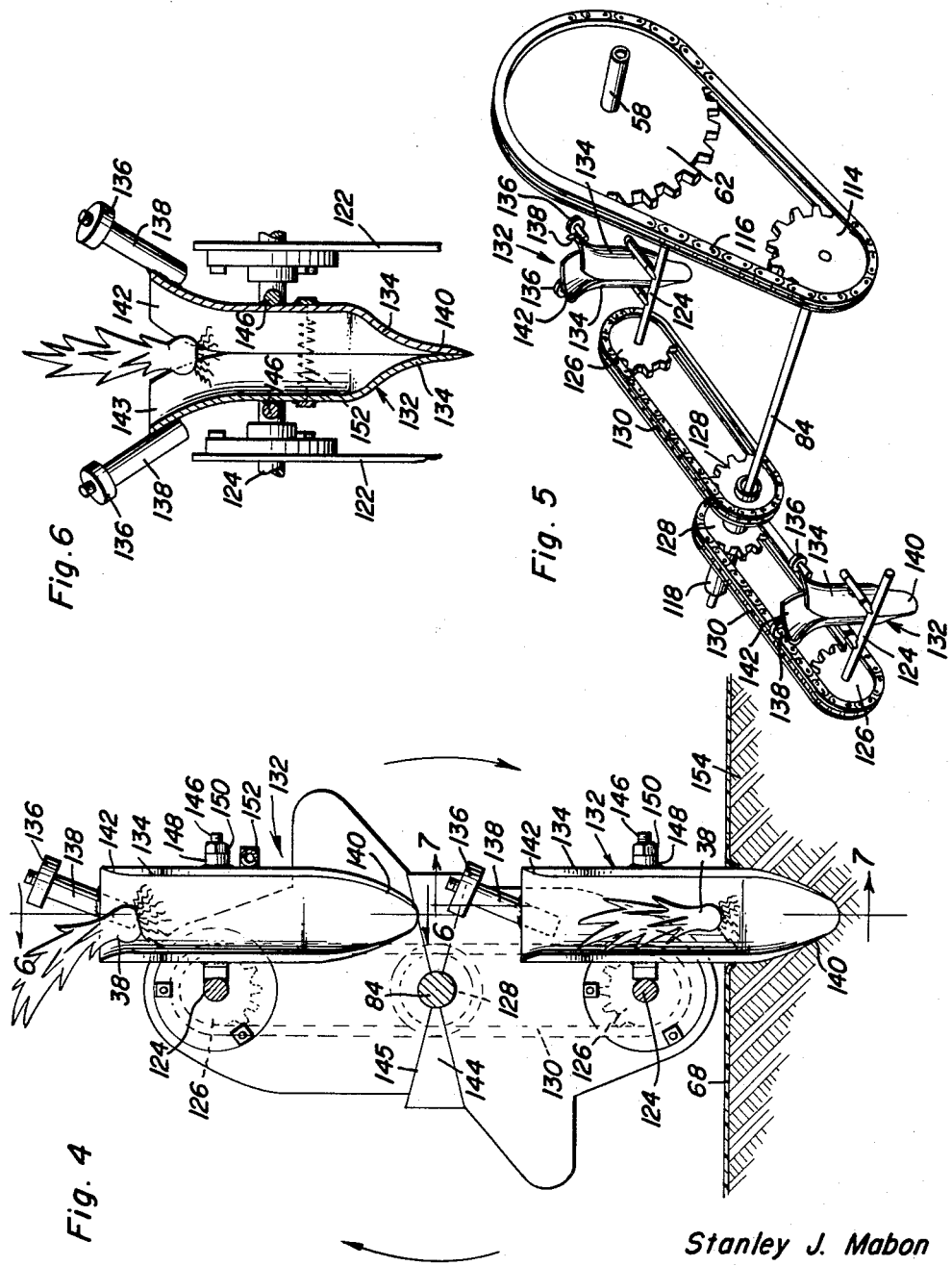

United States Patent Office 3,176,635
Patented Apr. 6, 1965

3,176,635
AUTOMATIC PLANTER AND PLASTIC
LAYING DEVICE
Stanley J. Mabon, Upper Mountain Road, Sanborn, N.Y.
Filed Jan. 9, 1963, Ser. No. 250,290
3 Claims. (Cl. 111—3)

This invention relates to an improved automatic planter and plastic laying device. Although there have been automatic planters which are fully capable of receiving, digging the ground for the reception of, and planting plants, most of these automatic planters have been specifically designed to handle a given type of plant.

In recent years there has been an increase in the use of plastic sheeting about plants in order to help in the retention of the moisture in the ground surrounding the plants. In addition to there being an increase in the use of plastic sheeting, various types of mulch paper are also utilized for the same purpose. The mulch paper and plastic sheeting not only provide means by which the water in the soil may be more effectively retained, but the plastic sheeting or mulch paper also prevents the growth of unwanted plants such as weeds and therefore eliminates the necessity of some cultivating operations.

Although some of the automatic planters heretofore designed are fully capable of planting young plants in an efficient manner, they have not necessarily been designed and constructed in a manner enabling them to be readily also utilized for laying mulch paper or plastic sheeting at the same time the young plants are being put out. Accordingly, it is the main object of this invention to provide an automatic planter designed primarily to include digging and planting receptacles for the young plants which are to be planted, shaped and mounted for movement relative to the planter in such a manner adapting the receptacles to cleanly pierce the mulch paper or plastic sheeting being laid during the process of planting the young plants in order that the mulch paper or plastic sheeting will closely embrace the stalk of the plants.

Another object of this invention, in accordance with the immediately preceding object, is to provide an automatic planter including plant receptacle and digging means which may be readily constructed in various sizes in order that substantially all types of young plants suited for automatic planting may be efficiently handled and planted by means of the automatic planter.

Still another object of this invention is to provide an automatic planter including means by which the opposite side longitudinal edge portions of the strip of mulch paper or plastic being laid may be seated in troughs formed by the planter and then covered up by means of soil removed to form the troughs.

Yet another object of this invention is to provide an automatic planter provided with means for pressing down the dirt around the newly planted plants and also maintaining the sheeting of mulch paper or plastic in contact with the ground as the plant receptacle and digging means are withdrawn from the ground through the sheeting each time a plant is planted.

Another object of this invention is to provide an automatic planter constructed in a manner whereby its support frame will be adjustable for use with either thirty-six or forty-eight inch plastic sheeting and mulch papers.

A final object of this invention to be specifically enumerated herein is to provide an automatic planter in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse vertical sectional view taken substantially upon the plane indicated by the section line 3—3 of FIGURE 2;

FIGURE 4 is a fragmentary enlarged longitudinal vertical sectional view showing the operation of the digging and plant receptacles;

FIGURE 5 is a fragmentary perspective view of the plant receptacle, ground digging and plant planting assembly portion of the planter;

FIGURE 6 is a fragmentary transverse vertical sectional view taken substantially upon the plane indicated by the section line 6—6 of FIGURE 4; and FIGURE 7 is a fragmentary transverse vertical sectional view taken substantially upon the plane indicated by the section line 7—7 of FIGURE 4.

Figure 1:
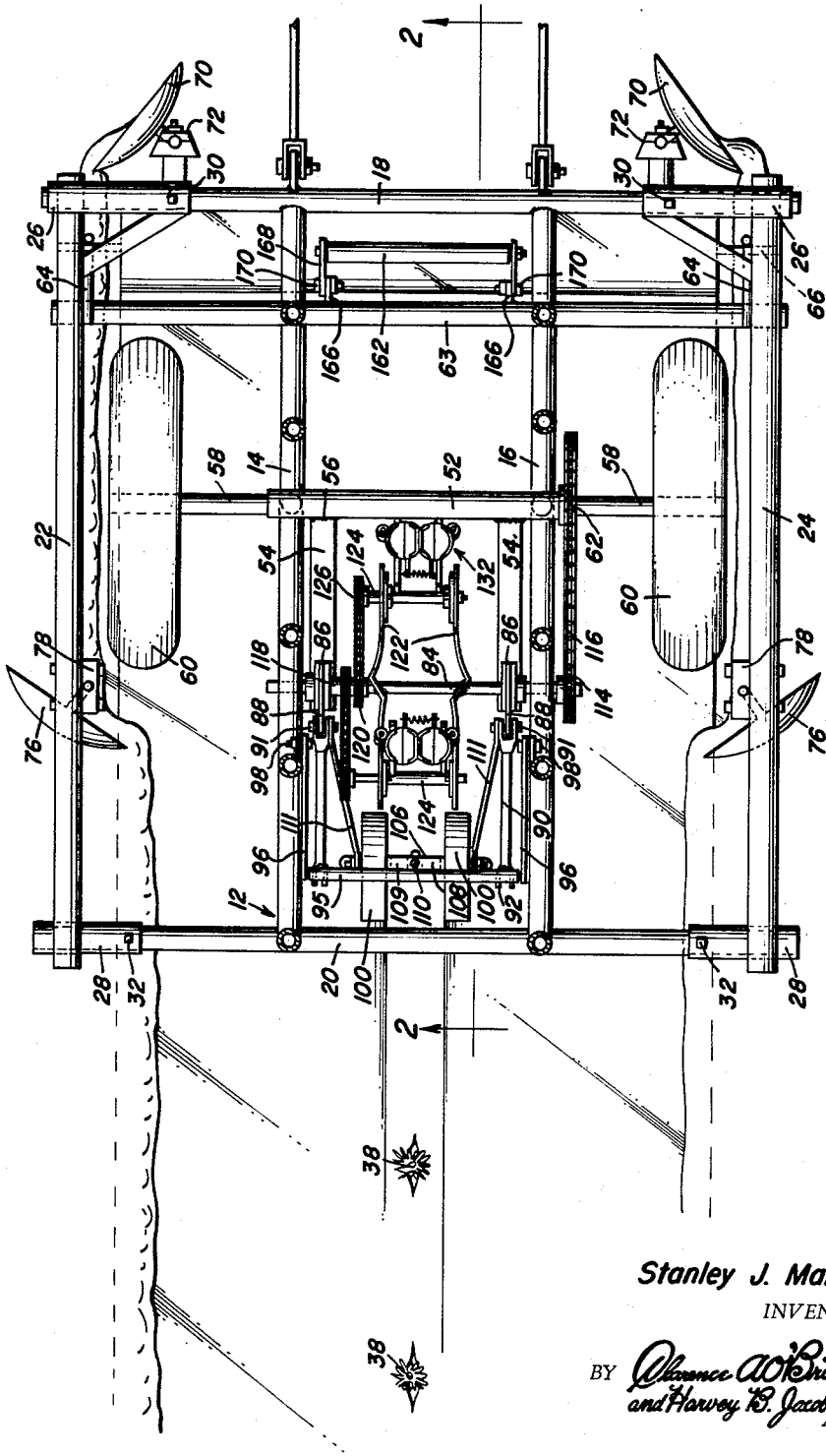
FIGURE 1 is a horizontal sectional view of the automatic planter as seen from above.

Referring now more specifically to the drawings the numeral 10 generally designates the automatic planter of the instant invention which includes a support frame referred to in general by the reference numeral 12.

Figure 2:
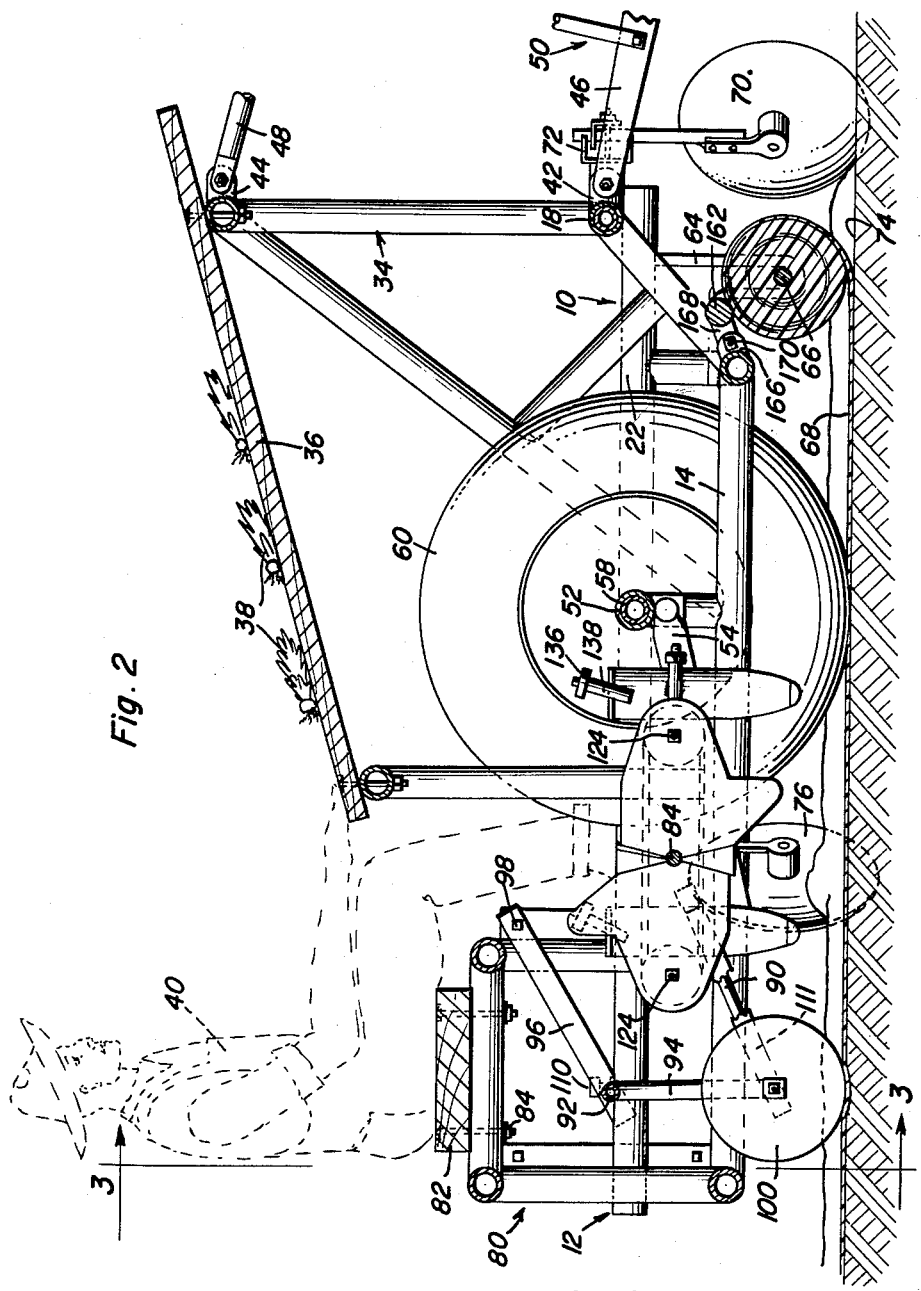
FIGURE 2 is a longitudinal vertical sectional view taken substantially upon a plane indicated by the section line 2—2 of FIGURE 1.

With attention now directed more specifically to FIGURES 1 and 2 of the drawings, it may be seen that the main frame 12 includes a pair of longitudinal members 14 and 16 which are interconnected at their opposite ends by means of a front transverse member 18 and a rear transverse member 20. The opposite ends of the transverse members 18 and 20 project beyond the remote sides of the longitudinal members 14 and 16. The free end portions of the transverse members 18 and 20 are interconnected by means of the longitudinal members 22 and 24 including transversely extending sleeve members 26 and 28 on their opposite ends which telescopingly receive the corresponding ends of the transverse members 18 and 20. The sleeve members 26 and 28 are provided with setscrews 30 and 32 respectively with the transverse members 18 and 20 whereby the longitudinal members 22 and 24 may be secured in adjusted extended positions relative to the longitudinal members 14.

The support frame 12 includes a raised plant storage deck section 34 on its forward end which supports a plant storage deck 36 upon which the plants 38 to the planted may be placed for easy access by the operator 40 of the planter 10. The raised plant supporting deck section 34 of the frame 12 includes a pair of apertured lower ears 42 and a single apertured upper ear 44 for pivotal securement to the lower and upper arms 46 and 48 respectively of a tractor three point lift generally referred to by the reference numeral 50.

Secured between the longitudinal members 14 and 16 is a tubular axle housing 52 which has a pair of rearwardly directed and generally horizontally disposed support arms 54 secured thereto in any convenient manner such as by welding 56. The opposite ends of the axle housing 52 are open and the adjacent ends of a pair of generally axially aligned axle stub shafts 58 are secured in the opposite ends of the axle housing 52 in any convenient manner for adjustable axial shifting of the stub axles 58 relative to the axle housing 52. A pair of ground engaging support wheels 60 are journaled on the remote ends of the stub axles 58 and a sprocket wheel 62 is mounted on one of the stub axles 58 for rotation therewith and also for axial shifting relative to that stub axle 58 in any convenient manner.

From FIGURE 2 of the drawings it may be seen that a pair of generally U-shaped support members 64 are dependingly supported from each of the longitudinal members 22 and 24 and a transverse member 63. A sheet 68 of plastic material is wound on a supporting shaft and the opposite ends of the supporting shaft 66 are cradled in the U-shaped support members 64 whereby the roll of plastic material is journaled for rotation from the frame 12.

A pair of plow discs 70 are dependingly supported from the sleeve members 26 by means of clamp assemblies 72 and are utilized to form generally parallel troughs 74 in which to receive the opposite side longitudinal edges of the sheet 68. A second pair of plow discs 76 are supported from the longitudinal members 22 and 24 by means of suitable clamp assemblies 78 and are utilized to throw the dirt removed to form the troughs 74 back over the longitudinal opposite side edge portions of the sheet 68 after the ground engaging support wheels 60 have rolled over these longitudinal edge portions of the sheet 68 in order to seat them in the troughs 74 prior to being covered by dirt placed thereon by means of the plow discs 76.

The main frame 12 also includes a rear raised portion generally referred to by the reference numeral 80 upon which a transversely extending seat 82 is secured by means of suitable fasteners 84 for supporting the operator 40 in a seated position immediately to the rear of the deck or table 36 supporting the plants 38.

With attention now directed more specifically to FIGURES 1 and 5 of the drawings it may be seen that a transversely extending support shaft 84 is journaled for rotation between the opposite ends of the support arms 54 by means of journal blocks 86. The journal blocks 86 also include apertured lug portions 88 to which the forward ends of a pair of radius arms 90 are pivotally secured by means of pivot fastener 91. The rear ends of the radius arms 90 are interconnected by means of as inverted U-shaped member 92 including a pair of upstanding legs 93 and 94 interconnected at their upper ends by means of a bight portion 95. The lower ends of the legs 93 and 94 are pivotally secured to the rear ends of the radius arms 90. In addition, the rear ends of a pair of links 96 are pivotally secured to the opposite ends of the bight portion 95 while their forward ends are pivotally secured to the portion 80 of the frame 12 by means of pivot fasteners 98.

A pair of packer wheels 100 are journaled from a pair of shafts 102, each being supported from the lower end of one of the legs 104 of an inverted U-shaped member 106 whose bight portion 108 is secured to the midpoint of the bight portion 109 by means of a fastener 110. The free ends of the shafts 102 have the rear ends of a pair of radius arms 111 pivotally secured thereto and the forward ends of the arm 111 are pivotally secured to the journal blocks 86 by the fasteners 91.

The support shaft 84 has a sprocket wheel 114 secured to one end thereof which is aligned with the sprocket wheel 62 and drivingly connected thereto by means of a chain 116. A sleeve 118 rotatably receives the opposite end of the support shaft 84 and is fixedly supported from the support arm 54 and has a pair of sprocket wheels 120 fixedly mounted thereon.

A pair of guide plates 122 are secured to the support shaft 84 and rotatably support a pair of mounting shafts 124 between corresponding pairs of opposite ends thereof with the shafts 124 generally paralleling the support shaft 84. Corresponding ends of the mounting shafts 124 have sprocket wheels 126 mounted thereon which are aligned with sprocket wheels 128 supported by the sleeve 118 and corresponding pairs of the sprocket wheels 126 and 128 are aligned and drivingly connected by means of chains 130.

A pair of combined plant receiving and digging receptacles generally referred to by the reference numeral 132 are supported from the mounting shafts and each of the receptacles 132 comprises a pair of generally semi-cylindrical sections 134. Each of the sections 134 has a nylon roller 136 mounted thereon by means of a stub shaft 138 and the receptacles 132 include wedge-shaped lower end portions 140 and flared upper end portions 142.

The guide plates 122 include pairs of cam portions 144 and 146 which are engageable by corresponding ones of the rollers 136 upon movement of the receptacles 132 to the lowered position illustrated by the lowermost receptacle 132 in FIGURE 4 of the drawings. The sections 134 are each pivotally secured to a pivot shaft 146 secured to the corresponding mounting shaft 124 in any convenient manner such as by welding and a sleeve portion 148 carried by that section which is rotatably mounted on the corresponding pivot shaft 146 and secured thereon by means of a threaded fastener 150.

The sections 134 of each receptacle 132 are yieldingly urged to a closed position by means of an expansion spring 152 secured between corresponding front edge portions of each pair of sections 134 below the corresponding pair of pivot shafts 46. As the receptacles 132 swing about the support shaft 84 as indicated by the arrows in FIGURE 4 of the drawings, they are maintained in upright positions by means of the chains 130. As the receptacles reach the bottom portion of their travel toward and away from the ground 154, the wedge-shaped lower ends thereof pierce the sheet 68 and the ground 154 making an upwardly opening recess in the latter. Thereafter, as the rollers 136 engage the cam portions 144 and 146, the lower ends of the sections 134 are spread apart in the manner illustrated in FIGURE 7 of the drawings whereby the plants 38 supported therein are dropped into the upwardly opening recesses 160 formed in the ground 154. Then, as the receptacles 132 are withdrawn from the recesses 160 upwardly through the sheet 68, the packer wheels 106 prevent the sheet 68 from being pulled away from the ground 154 and also tamp the ground 154 about the plants 38 as the wheels pass by on opposite sides of the plants 38.

From FIGURE 1 of the drawings it may be seen that a drag or friction roller 162 is swingably supported from the transverse member 164 of the frame 12 which supports a pair of apertured ears 166. The friction or drag roller 162 is journaled between the forward ends of a pair of support arms 168 whose rear ends are pivotally secured to the apertured ears 162 by means of pivot fasteners 170.

If it is desired to use a wider sheet of plastic material, the longitudinal members 22 may be adjusted further apart by loosening the setscrews 30 and 32 and sliding the sleeve members 26, 28 further outwardly toward the ends of the transverse members 18 and 20. After the setscrews have again been tightened, the stub axles 58 may be accordingly adjusted with the sprocket wheel 62 being slid along the corresponding stub axle 58 a distance sufficient to maintain it in alignment with the sprocket wheel 114.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plant receptacle, ground digging and plant planting assembly comprising a support frame adapted to be moved along a path of movement above the ground, a support shaft journaled from said frame for rotation about a generally horizontally disposed axis extending transversely of said path of movement, a pair of upstanding coacting members defining an upwardly opening receptacle, a pair of mounting plates secured to said shaft at points spaced longitudinally therealong and for rotation therewith, a mounting shaft journaled between said plates and generally paralleling said support shaft, said coacting members being mounted on said mounting shaft for rotation therewith, a stationary drive wheel stationarily supported from said frame and concentric with said support shaft, a driven wheel on said mounting shaft mounted for rotation therewith, an endless flexible drive member entrained over said drive and driven wheels drivingly connecting the former to the latter for maintaining said receptacle generally upright during swinging movement of said coacting members about the axis of rotation of said support shaft, and means carried by said coacting members engageable with portions of said plates for swinging the lower ends of said coacting members apart in response to their movement to lowered positions relative to said frame.

2. The combination of claim 1 wherein said ground digging and plant planting assembly includes a plurality of pairs of coacting members each of said pairs of coacting members being mounted on its own mounting shaft generally paralleling and driven from said stationary drive wheel and engageable with said plates for opening the lower ends of the receptacles defined thereby.

3. The combination of claim 2 wherein said receptacles defined by said pairs of coacting members include wedge-shaped lower ends adapted to pierce the ground against which they are advanced.

References Cited by the Examiner
UNITED STATES PATENTS

| | | | |
|---|---|---|---|
| 934,095 | 9/09 | Rhoades | 111—3 X |
| 1,803,273 | 4/31 | Richards et al. | 111—3 |
| 2,625,122 | 1/53 | Carelock | 111—3 |
| 2,626,578 | 1/53 | Morine | 111—3 |
| 2,708,812 | 5/55 | Nakai | 111—3 X |
| 2,740,233 | 4/56 | Reynolds | 47—9 |
| 2,890,665 | 6/59 | Kang | 111—3 |
| 2,961,979 | 11/60 | Stanley et al. | 111—3 |
| 3,103,186 | 9/63 | Saifuku | 111—2 |
| 3,139,847 | 7/64 | Bucher et al. | 111—3 |

OTHER REFERENCES

"Publication," Texas Agricultural Progress, vol. 7, No. 4; pages 9–10, July-August 1961; together with photograph and two pages of descriptive material dated U.S. Patent Office, January 30, 1962.

ABRAHAM G. STONE, *Primary Examiner.*

WILLIAM A. SMITH, III, *Examiner.*